United States Patent

Stern et al.

Patent Number: 5,842,772
Date of Patent: Dec. 1, 1998

[54] LIGHTED EYEGLASS ASSEMBLY WITH HANDLE

[76] Inventors: Jane Stern, 704 Jefferson Ave.; Eileen R. Miller, 510 Highridge Ave., both of Cliffside Park, N.J. 07010

[21] Appl. No.: 969,174

[22] Filed: Nov. 12, 1997

[51] Int. Cl.⁶ .................................................. F21V 33/00
[52] U.S. Cl. ........................ 362/109; 362/253; 362/285; 362/155; 362/158
[58] Field of Search ................................ 362/109, 103, 362/197, 285, 287, 418; 351/63, 158, 155, 42

[56] References Cited

U.S. PATENT DOCUMENTS

| | | | |
|---|---|---|---|
| D. 349,123 | 7/1994 | Cooley et al. | 351/44 |
| 2,948,500 | 8/1960 | Kuhn | 351/155 |
| 4,086,004 | 4/1978 | Scrivo et al. | 351/158 |
| 4,584,633 | 4/1986 | Comfort | 362/253 |
| 4,681,410 | 7/1987 | Paulsen | 351/63 |
| 4,887,895 | 12/1989 | Tzeng | 351/63 |
| 5,176,262 | 1/1993 | Zoueki | 248/902 |

*Primary Examiner*—Thomas M. Sember

[57] ABSTRACT

A lighted eyeglass assembly with handle is provided including an eyeglass assembly and an elongated handle housing. The housing has the eyeglass assembly pivotally coupled thereto such that a universal coupling afforded. A light assembly includes a bulb mounted to a top of the handle housing and connected to a battery situated within the handle housing.

8 Claims, 2 Drawing Sheets

LIGHTED EYEGLASS ASSEMBLY WITH HANDLE

BACKGROUND OF THE INVENTION

1. Field of the Invention

The present invention relates to a lighted eyeglass assembly with handle and more particularly pertains to allowing a user to read or perform other functions while in the absence of ambient light.

2. Description of the Prior Art

The use of lighted eyeglasses is known in the prior art. More specifically, lighted eyeglasses heretofore devised and utilized for the purpose of reading at night are known to consist basically of familiar, expected and obvious structural configurations, notwithstanding the myriad of designs encompassed by the crowded prior art which have been developed for the fulfillment of countless objectives and requirements.

By way of example, the prior art includes U.S. Pat. No. 4,086,004; U.S. Pat. Des. No. 349,123; U.S. Pat. No. 4,681,410; U.S. Pat. No. 5,440,462; U.S. Pat. No. 4,820,035; and U.S. Pat. No. 4,887,895.

In this respect, the lighted eyeglass assembly with handle according to the present invention substantially departs from the conventional concepts and designs of the prior art, and in so doing provides an apparatus primarily developed for the purpose of allowing a user to read while in the absence of ambient light.

Therefore, it can be appreciated that there exists a continuing need for a new and improved lighted eyeglass assembly with handle which can be used for allowing a user to read while in the absence of ambient light. In this regard, the present invention substantially fulfills this need.

SUMMARY OF THE INVENTION

In view of the foregoing disadvantages inherent in the known types of lighted eyeglasses now present in the prior art, the present invention provides an improved lighted eyeglass assembly with handle. As such, the general purpose of the present invention, which will be described subsequently in greater detail, is to provide a new and improved lighted eyeglass assembly with handle which has all the advantages of the prior art and none of the disadvantages.

To attain this, the present invention essentially comprises an eyeglass assembly. As shown in FIG. 1, the eyeglass assembly includes a frame having a pair of elliptical loops coupled in a side-by-side coplanar relationship via a central post integrally coupled therebetween. A pair of lenses are mounted in the corresponding elliptical loop of the frame. The eyeglass assembly further includes a side post coupled to a side of one of the elliptical loops. Such side post resides in linear alignment with a line connecting the foci of the elliptical loops and remains in coplanar relationship therewith. For reasons that will become apparent hereinafter, a ball is integrally coupled to an end of the post. Also included is a handle housing having an upper extent with a hollow cylindrical configuration. The upper extent includes a socket formed in a periphery thereof at a position about ¼ the length of the upper extent from a top thereof. A fork is integrally formed at a bottom of the upper extent. The handle housing further includes a lower extent with a cylindrical configuration and a length about ⅓ that of the upper extent. The lower extent has a tab integrally formed on a top thereof for hingably coupling with the fork of the upper extent. As such, the lower extent pivots only within a single plane.

Finally, a light assembly is provided including a transparent hemispherical cover mounted on the top of the upper extent of the handle. By this structure, a transparent compartment is defined for housing a bulb. A battery compartment is situated within the upper extent below the socket thereof for housing a battery. Connected between the battery and bulb is a slide switch situated at a side of the upper extent opposite the socket and further at an elevation between the top of the upper extent and the socket. During use, the switch has a first orientation for precluding the supply of power to the bulb and a second orientation for allowing the supply of power to the bulb.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved lighted eyeglass assembly with handle which has all the advantages of the prior art lighted eyeglasses and none of the disadvantages.

It is another object of the present invention to provide a new and improved lighted eyeglass assembly with handle which may be easily and efficiently manufactured and marketed.

It is a further object of the present invention to provide a new and improved lighted eyeglass assembly with handle which is of a durable and reliable construction.

An even further object of the present invention is to provide a new and improved lighted eyeglass assembly with handle which is susceptible of a low cost of manufacture with regard to both materials and labor, and which accordingly is then susceptible of low prices of sale to the consuming public, thereby making such lighted eyeglass assembly with handle economically available to the buying public.

Still yet another object of the present invention is to provide a new and improved lighted eyeglass assembly with handle which provides in the apparatuses and methods of the prior art some of the advantages thereof, while simultaneously overcoming some of the disadvantages normally associated therewith.

Still another object of the present invention is to allowing a user to read while in the absence of ambient light.

Lastly, it is an object of the present invention to provide a new and improved lighted eyeglass assembly with handle including an eyeglass assembly and an elongated handle housing. The housing has the eyeglass assembly pivotally coupled thereto such that a universal coupling afforded. A light assembly includes a bulb mounted to a top of the handle housing and connected to a battery situated within the handle housing.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figure 1:
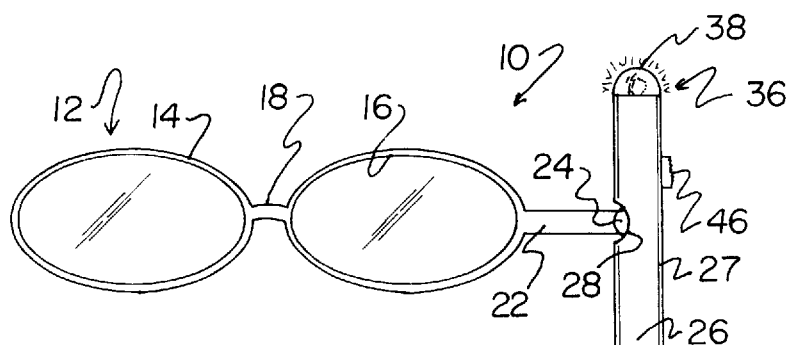
FIG. 1 is a perspective illustration of the preferred embodiment of the lighted eyeglass assembly with handle constructed in accordance with the principles of the present invention.
Figure 2:
FIG. 2 is a side view of the present invention with the lower extent of the handle housing angled at a user-defined orientation.
Figure 2:
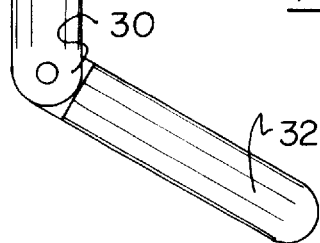

With reference now to the drawings, and in particular to FIG. 1 thereof, a new and improved lighted eyeglass assembly with handle embodying the principles and concepts of the present invention and generally designated by the reference numeral 10 will be described.

The present invention, the new and improved lighted eyeglass assembly with handle, is comprised of a plurality of components. Such components in their broadest context include eyeglass assembly, handle housing, and light assembly. Such components are individually configured and correlated with respect to each other so as to attain the desired objective.

More specifically, it will be noted that the system 10 of the present invention includes an eyeglass assembly 12. As shown in FIG. 1, the eyeglass assembly includes a frame 14 having a pair of elliptical loops 16 coupled in a side-by-side coplanar relationship via a central post 18 integrally coupled therebetween. A pair of lenses are each mounted in the corresponding 20 elliptical loop of the frame. The eyeglass assembly further includes a side post 22 with a length at least twice that of the central post coupled to a side of one of the elliptical loops. Such side post resides in linear alignment with a line connecting the foci of the elliptical loops and remains in coplanar relationship therewith. For reasons that will become apparent hereinafter, a ball 24 is integrally coupled to an end of the post.

Also included is a handle housing 26 having an upper extent 27 with a hollow cylindrical configuration. The upper extent includes a socket 28 formed in a periphery thereof at a position about ¼ the length of the upper extent from a top thereof. The socket functions to receive the ball of the eyeglass assembly thereby affording a universal joint. A fork 30 is integrally formed at a bottom of the upper extent.

The handle housing further includes a lower extent 32 with a cylindrical configuration and a length about ⅓ that of the upper extent. The lower extent has a tab 34 integrally formed on a top thereof. The tab serves to be hingably coupled with the fork of the upper extent by way of a pivoting post or the like. As such, the lower extent pivots only within a single plane. Such plane preferably remains perpendicular to a plane which contains the socket and switch. In the preferred embodiment, the coupling between the upper and lower extent of the housing has a predetermined amount of friction associated therewith which is capable of permitting the eyeglass to remain elevated when the housing is held by the lower extent.

Figure 3:
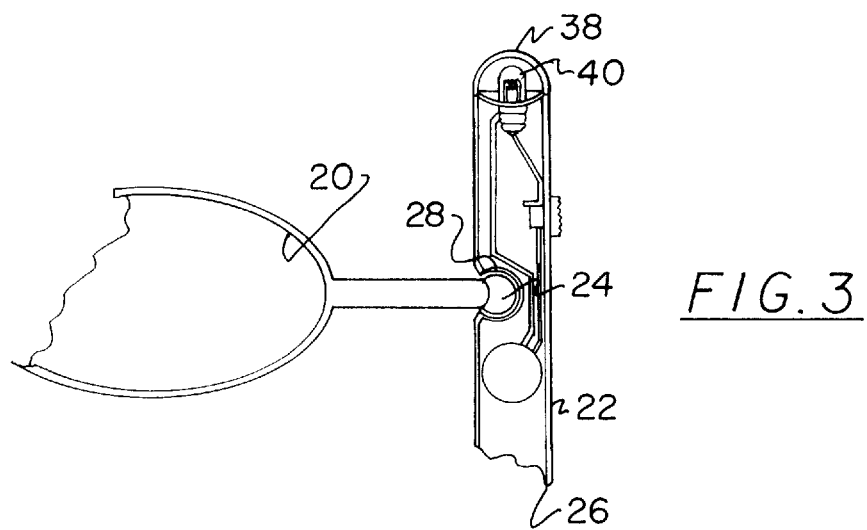
FIG. 3 is a cross-sectional view of the handle housing showing a first embodiment of a battery compartment.
Figure 4:
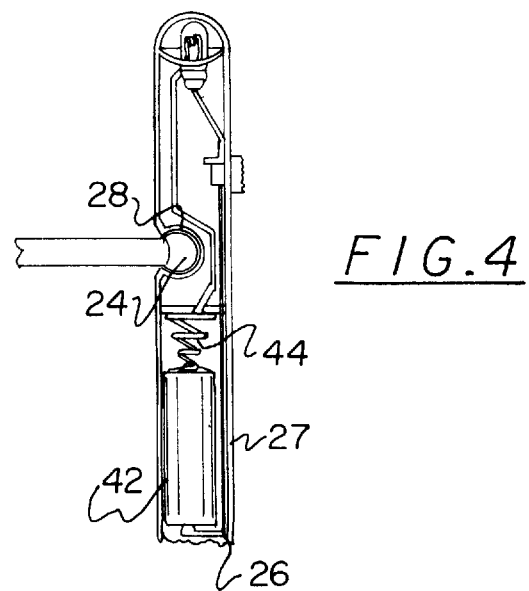
FIG. 4 is a cross-sectional view of the handle housing showing a second embodiment of a battery compartment.

Finally, a light assembly 36 is provided including a transparent hemispherical cover 38 mounted on the top of the upper extent of the handle. By this structure, a transparent compartment is defined for housing a bulb 40. A battery compartment 42 is situated within the upper extent below the socket thereof for housing a battery. Such battery compartment may comprise a coiled spring 44 to contain a cylindrical battery, or in the alternative, be adapted to house a watch battery. Note FIGS. 3 & 4, respectively.

Connected between the battery and bulb is a slide switch situated at a side of the upper extent opposite the socket and further at an elevation between the top of the upper extent and the socket. The slide switch ideally has a roughed surface. During use, the switch has a first orientation for precluding the supply of power to the bulb and a second orientation for allowing the supply of power to the bulb. As such, a user may hold the lower extent of the housing and orient the eyeglasses such that the same may be conveniently used. As an option, the light assembly may be actuated to afford light during reading in the absence of ambient light.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved lighted eyeglass assembly with handle comprising, in combination:

an eyeglass assembly including a frame having a pair of elliptical loops coupled in a side-by-side coplanar relationship via a central post integrally coupled therebetween wherein a pair of lenses are mounted in the corresponding elliptical loop of the frame, the eyeglass assembly further including a side post coupled to a side of one of the elliptical loops with such side post being in linear alignment with a line connecting foci of the elliptical loops and in coplanar relationship therewith, wherein a ball is integrally coupled to an end of the post;

a handle housing having an upper extent with a hollow cylindrical configuration, the upper extent including a socket formed in a periphery thereof at a position about ¼ a length of the upper extent from a top thereof and a fork integrally formed at a bottom of the upper extent, the handle housing further including a lower extent with a cylindrical configuration and a length about ⅓ that of the upper extent, the lower extent having a tab integrally formed on a top thereof for hingably coupling with the fork of the upper extent such that the lower extent pivots only within a single plane; and a light assembly including a transparent hemispherical cover mounted on a top of the upper extent of the handle thus defining a transparent compartment for housing a bulb, a battery compartment situated within the upper extent of the handle below the socket of the handle for housing a battery, and a slide switch situated at a side of the upper extent opposite the socket and further at an elevation between the top of the upper extent and the socket, wherein the switch is connected between the bulb and the battery with a first orientation for precluding a supply of power to the bulb and a second orientation for allowing the supply of power to the bulb.

2. A lighted eyeglass assembly with handle comprising:

an eyeglass assembly;

an elongated handle housing having the eyeglass assembly coupled thereto; and a light assembly including a bulb mounted to a top of the handle housing and connected to a battery situated within the handle housing.

3. A lighted eyeglass assembly with handle as set forth in claim 2 wherein a switch is mounted on the handle housing and connected between the battery and bulb for selectively supplying power thereto.

4. A lighted eyeglass assembly with handle as set forth in claim 2 wherein the handle housing is rigid and linear.

5. A lighted eyeglass assembly with handle as set forth in claim 2 wherein the handle has a bottom extent hingably coupled to an upper extent to which the bulb and eyeglass assembly is mounted.

6. A lighted eyeglass assembly with handle as set forth in claim 5 wherein the lower extent has a length ⅓ that of the upper extent.

7. A lighted eyeglass assembly with handle as set forth in claim 2 wherein the eyeglass assembly is mounted to the handle by way of a side post which is in coplanar relationship with the eyeglass assembly.

8. A lighted eyeglass assembly with handle as set forth in claim 2 wherein the eyeglass assembly is pivotally coupled to the handle housing.

* * * * *